(12) United States Patent
Gargi

(10) Patent No.: US 6,528,715 B1
(45) Date of Patent: Mar. 4, 2003

(54) MUSIC SEARCH BY INTERACTIVE GRAPHICAL SPECIFICATION WITH AUDIO FEEDBACK

(75) Inventor: Ullas Gargi, Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/984,818

(22) Filed: Oct. 31, 2001

(51) Int. Cl.[7] ............................. G10H 1/18; G10H 7/00
(52) U.S. Cl. ............................................ 84/615; 84/645
(58) Field of Search .......................... 84/609, 615, 653, 84/645

(56) References Cited

U.S. PATENT DOCUMENTS

| | | | | |
|---|---|---|---|---|
| 5,402,339 A | * | 3/1995 | Nakashima et al. | 707/1 |
| 5,739,451 A | * | 4/1998 | Winksy et al. | 84/609 |
| 5,874,686 A | * | 2/1999 | Ghias et al. | 84/609 |
| 5,963,957 A | * | 10/1999 | Hoffberg | 707/102 |
| 6,121,530 A | * | 9/2000 | Sonoda | 84/609 |
| 6,188,010 B1 | * | 2/2001 | Iwamura | 84/477 R |
| 6,201,176 B1 | * | 3/2001 | Yourlo | 434/307 A |
| 6,225,546 B1 | * | 5/2001 | Kraft et al. | 700/94 |
| 6,307,139 B1 | * | 10/2001 | Iwamura | 84/601 |

OTHER PUBLICATIONS

Ghias et al., "Query by Humming: Musical Information Retrieval in an Audio Database", ACM Multimedia 95 Proceedings, 1995, pp. 231–236.

Bainbridge et al., "Towards a Digital Library of Popular Music", Proceedings of the Fourth ACM Conference on Digital Libraries, 1999, pp. 161–169.

Lemström, K. and Perttu, S., "SEMEX—An Efficient Music Retrieval Prototype", First International Symposium on Music Information Retrieval (ISMIR 2000), 2000.

McNab et al., "Towards the Digital Music Library: Tune Retrieval from an Acoustic Input", Proc. Digital Libraries, 1996, pp. 11–18.

Center for Computer Assisted Research in the Humanities (CCARH) at Stanford University and the Cognitive and Systematic Musicology Laboratory at the Ohio State University, entitled Themefinder.

* cited by examiner

*Primary Examiner*—Jeffrey Donels

(57) ABSTRACT

A method and system for creating a musical query are disclosed that graphically generate a musical segment that represents a portion of a desired piece of music. Audio feedback is provided to a user by playing the musical segment. Then, a musical query is generated based on the musical segment. Optionally, the graphical generation the musical segment and audio feedback steps can be repeated until the user acknowledges the musical segment is acceptable. Then, after the user has acknowledged the musical segment is acceptable, the musical query is generated.

27 Claims, 4 Drawing Sheets

MUSIC SEARCH BY INTERACTIVE GRAPHICAL SPECIFICATION WITH AUDIO FEEDBACK

BACKGROUND OF THE INVENTION

1. Field of the Invention

The present invention relates to multimedia asset management systems, and in particular to the location and retrieval of multimedia files based on a graphically entered music search.

2. Background Information

Audio searching of large multimedia databases has many important applications. Large multimedia databases or collections can contain both audio and video files. Conventional systems store and retrieve specific information from a database using, for example, descriptive information regarding the image file, such as file creation date, file name, file extension and the like. This form of data search and retrieval is not significantly different from the any other digital information.

By relying on the file information, only cursory information can be obtained about the file and nothing at all specifically related to the audio content of the file. For example, an audio file could have a name that has no relation to the features or content of the file, such as a file containing samples of barking dogs could have the file name "cats". Other systems can provide additional information based on the content of the file. However, this is usually done by keyword annotation, which is a laborious task.

Multimedia databases containing music files can have a variety of formats. However the Musical Instrument Digital Interface (MIDI) format, which has been used since 1983, is the most prevalent. The MIDI format has many advantages for representing music in a digital form. One of the most relevant features of the MIDI format for musical searching is the standardization of the musical scale into a range of integers, from 0 to 127. For example, middle C is assigned integer value of 60, corresponding notes above and below middle C are represented by corresponding integers (i.e., the C# above middle C is MIDI note 61). Additionally, the MIDI format allows for multiple tracks containing musical notes, percussion, timing, and the like, which provides a rich environment for digitally describing a musical piece. Therefore, the MIDI format is used in the following description. However, those skilled in the art will appreciate that the invention can be practiced on any file format that can be stored in a searchable format. Further, those skilled in the art will appreciate that the music files can be stored in related databases, where a searchable data set (e.g., MIDI files) is linked to a data set containing music files that are not easily searchable (e.g., raw audio files).

The amount of multimedia information available today due to the evolution of the internet, low-cost devices (e.g., digital video cameras, digital cameras, video capture cards, MIDI devices, audio cards, digital audio, and the like) to generate multimedia content, and low-cost storage (e.g., hard disks, CDs, DVD, flash memory, and the like) increases the need to search and retrieve relevant multimedia data efficiently. Unlike text-based retrieval, where keywords are successfully used to index into documents, multimedia data retrieval has no easily accessed indexing feature.

One approach to searching audio portions of multimedia collections is to hum a portion of the audio as the search criteria. A query by humming system is described in Ghias et al., "Query by Humming: Musical Information Retrieval in an Audio Database", ACM Multimedia 95 Proceedings, 1995, pages 231–236, which is hereby incorporated by reference in its entirety. Query by humming requires a user to hum a portion of the audio file, which is then converted into a musical contour (i.e., a relative pitch stream of audio symbols). The musical contour can be represented as a simple string of characters, such as "U, D, S", where U represents that the current note is higher than previous note, D represents that the current note is lower than previous note, and S represents that the current note is the same pitch as previous note. Files in a multimedia database that are being searched can be converted to this nonstandard string representation, so these files can be compared to the hummed query.

Although the query by humming system allows the user to search a database containing audio files based on the content of the audio file, it is limited to only the melody of the music. Important features of the audio file are not searched, such as the rhythm section, bass line and percussion of the musical piece. Additionally, the string representation does not correspond to traditional musical timing, which eliminates another valuable part of the musical composition, i.e., the duration of the notes (eighth, quarter, whole, etc.) is not used to search the audio files. The query by humming system relies on the user's ability to accurately reproduce a portion of the desired audio file by humming. Therefore, the user's ability to hum is a key and uncontrollable variable in determining the performance of the system.

Another system is disclosed in an article by Bainbridge et al., "Towards a Digital Library of Popular Music", Proceedings of the Fourth ACM Conference on Digital Libraries, 1999, pages 161–169, which is hereby incorporated by reference in its entirety. The system provides two modes of searching music databases. First, a text-based query allows a user to search for keywords that have been associated with the music file. For example, a user can search on composers, artists, lyrics, and the like. However, these keywords are only descriptive and are only as reliable as the association (i.e., a music file can have incorrect keywords associated). Therefore, the keyword searching does not provide any search capability of the actual audio portion of the file. A second search mode provides melody-based searching. The melody-based searching converts an audio input to a sequence of notes. The sequence of notes is then used to search a database of musical files. The second search mode allows a user to search the actual content of the musical files to retrieve appropriate matches. However, the audio input is based on a user that sings, hums, whistles, etc. the melody. Therefore, the skill of the user still is a problem for use by the general population (e.g., the ability to successfully hum or whistle a tune).

Alternatively, the search can be entered by a MIDI keyboard, thereby avoiding potential conversion errors from raw audio input to notes. However, the musical knowledge and playing skill are still required by the user to successfully input the melody searches. Combined searches using both the text and melody-based searching modes are also disclosed by Bainbridge et al. These combined searches allow users to narrow scope of the melody-based search to, e.g., certain artists, etc. Although, the combined search can narrow the scope of melody-based searching, it does not overcome previously mentioned problems of each system. For example, an incorrect label in the artist field may exclude the desired music file and a poorly hummed input will not be helped by restricting the scope of the database that is searched.

Still another musical search system is described in an article by Lemström, K. and Perttu, S., "SEMEX—An Efficient Music Retrieval Prototype", First International Symposium on Music Information Retrieval (ISMIR 2000), 2000, which is hereby incorporated by reference in its entirety. The SEMEX (Search Engine for Melodic Excerpts) system relies on the pitch level of notes, similar to the prior discussed systems. The pitch levels are represented as integers, ranging from 0 to r that correspond to various representations of the musical files (e.g., r=2 for musical contouring such as used by the Ghias et al. system, r=10 for QPI classification, and r=127 for MIDI files). The input is a sequence of sets of integers that correspond to individual notes or chords and is a subset of the pitch levels. The query is in the form of integers that can be a subset of the input sequence, if the input sequence is long. The music query is generated by a pitch estimator that receives a digital audio input and converts it into a symbolic form (i.e., a string of integers that is compatible with the music files in the database). In addition to melody searching (i.e., monophonic), the SEMEX system allows for searching of chords (i.e., polyphonic).

A non-profit collaborative project of the Center for Computer Assisted Research in the Humanities (CCARH) at Stanford University and the Cognitive and Systematic Musicology Laboratory at the Ohio State University, entitled Themefinder, is directed to a music search engine for music themes. The search engine is a nongraphical system which conducts searches based on specialized musicological features.

Current systems for creating queries for searching musical databases are based on the users musical talent to recreate (i.e., hum, whistle, sing, etc.) a portion of the musical file that the user desires to retrieve. Therefore, the performance of these systems varies wildly from user to user. It is desired to have a method and system for graphically creating musical queries that provide audio feedback to improve the accuracy of the query generation. Additionally, it is desired to have an interactive system that allows a user to adjust the musical query based on the audio feedback.

SUMMARY OF THE INVENTION

The present invention is directed to methods and systems for querying and retrieving multimedia data files. An exemplary method comprises: graphically generating a musical segment that represents a portion of a desired piece of music; providing audio feedback to a user by playing the musical segment; and generating a musical query based on the musical segment.

An exemplary system for creating a musical query comprises logic that graphically generates a musical segment that represents a portion of a desired piece of music; logic that provides audio feedback to a user by playing the musical segment; and logic that generates a musical query based on the musical segment.

BRIEF DESCRIPTION OF THE DRAWINGS

The above features and advantages of the invention, and additional features and advantages of the invention, will be better appreciated from the following detailed description of the invention made with reference to the drawings, wherein.

DETAILED DESCRIPTION OF THE PREFERRED EMBODIMENTS

Figure 1:
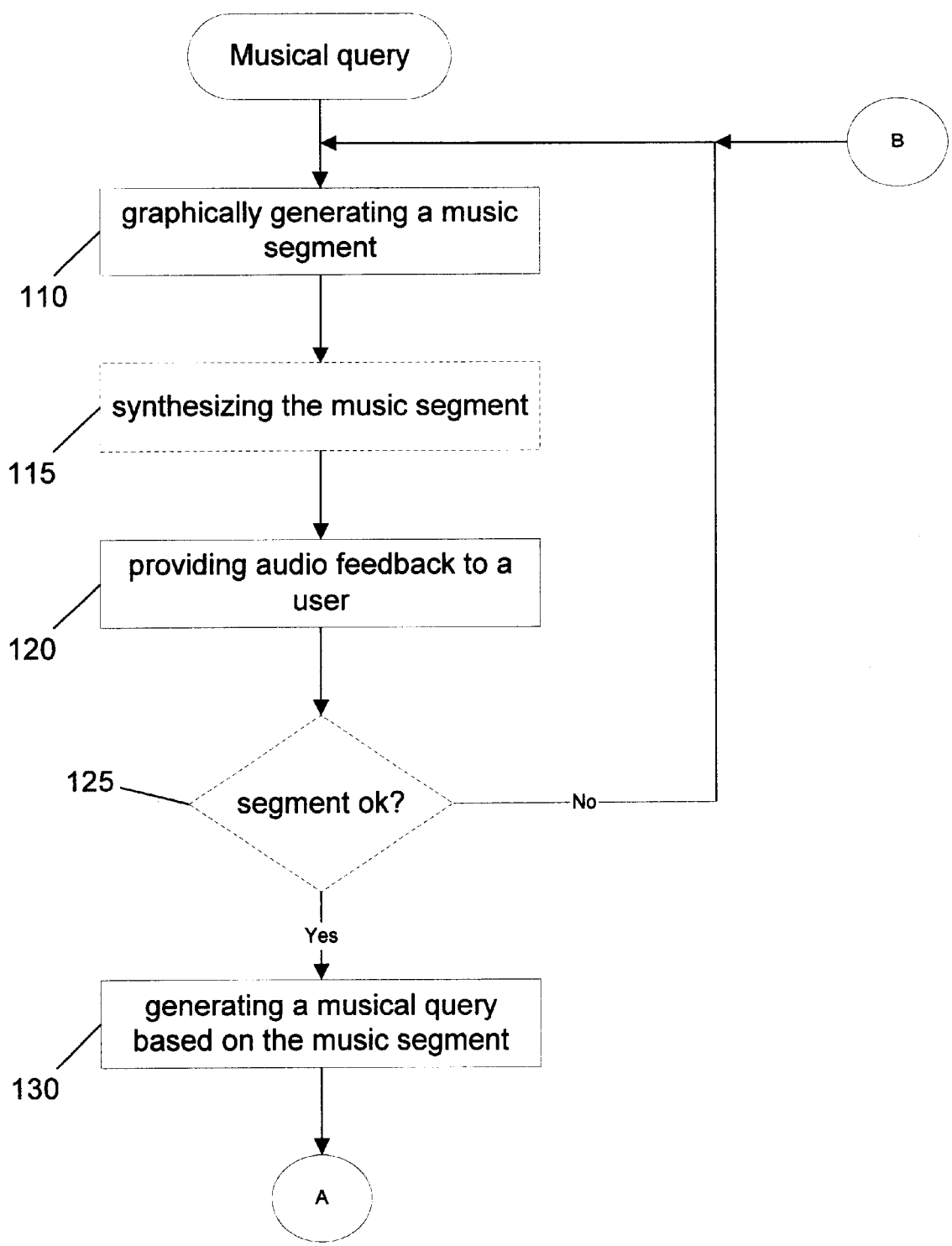
FIG. 1 shows a flow chart of an exemplary method of the present invention.

FIG. 1 is a flow chart of an exemplary method for creating a musical query. In step 110, the method begins with the graphical generation of a musical segment. For example, the user can generate a graphical representation which approximates a piece of music that is to be searched for in a database of musical pieces and/or representations of music. The graphical representation can be generated entirely by the user, or can be generated by modifying a graphical representation that corresponds to an existing piece of music the user has selected as a starting point in the search.

Those skilled in the art will appreciate that the desired piece of music can be any musical file, including but not limited to CD audio tracks, MIDI, MP3, wav, au, and the like. In addition, any standard internal representation can be used including, but not limited to, the ** kern representation, written for example in the Humdrum representation language, as used in conjunction with the aforementioned Themefinder project. This project is directed to a search engine for music themes based on specialized musicological features. Graphical representations of musical segments developed in accordance with exemplary embodiments of the present invention can be used to locate a music segment that has been stored using this format. The desired musical piece can also be a portion of a multimedia file containing both video and audio, such as AVI files, MPEG files, QT files, and the like. The invention is applicable to any file that can be obtained via a musical search. Alternately, or in addition, the musical segment can be generated and/or modified in response to user inputs, to change characteristics of the revised segment.

The method continues in step 120 by providing audio feedback to a user by playing the musical segment. Those skilled in the art will appreciate that this can be accomplished in a variety of ways. For instance, the graphical waveform defined by the user can be converted to an audio signal and output to a speaker. The musical segment can be synthesized into a MIDI format and played as notes via a MIDI compatible sound card. Optionally, user inputs can be used to modify the musical segment which has been synthesized, and this process repeated until an acceptable musical segment has been obtained.

The conversion of the graphical representation to an audio format can be implemented in any of a number of ways. For example, where the graphical representation has been converted to a MIDI format, it can be subsequently played through a standard MIDI sound card. In one implementation, the MIDI representation can contain up to 16 channels, each of which corresponds to an instrument, and each of which is identified by, for example, a 4-bit header in the data stream. In such an implementation, the beginning of a musical piece can include a program change MIDI data segment to map channels to particular programs on a synthesizer (i.e., to different instruments). For example, channel 1 can map to a piano, channel 2 can map to a guitar, channel 3 can map to a drum, and so forth.

The graphical representation-to-MIDI conversion can be implemented using a module which chooses appropriate instruments using general MIDI standard programs for the melody, bass and rhythm parts of the musical piece. The selection of appropriate instruments can, for example, be based on a user specification in a user interface. For example, the user can choose a piano for melody, a cello for bass and a triangle for rhythm. Alternately, the selection can be based on user input style values. For example, jazz can be mapped to piano, bass string and bongo drums; classical can be mapped to violin, cello and acoustical bass drum, and so forth. Those skilled in the art will appreciate that rather than specific user selections, default values can be selected. The selections can be encoded as appropriate program change MIDI messages. Those skilled in the art will appreciate that user interface is not limited, and can be designed to accommodate any of a variety of inputs. For example, the interface can be configured to allow the user to select different instruments for different parts of the musical piece. The user interface can also be modified in any of a variety of ways. For example, the user interface can include a chord section in addition to the sections already mentioned with respect to melody, bass and rhythm.

Where bass, melody and rhythm graphical representations have been associated with a musical piece, they can be aligned in time, or realigned by the user via the interface. For example, the user can specify a second bass part of the musical piece to begin one beat after the melody. A tempo slider can be used to determine absolute timing and rate of the audio to be generated. Those skilled in the art will appreciate that the graphical representation-to-MIDI conversion module can use a tempo slider setting to generate MIDI time codes for each subsequent message (e.g., note on/off message) sent to the sound card.

The graphical representation-to-MIDI conversion module next issues channel voice messages detailing, for example, note on/off, aftertouch pressure, polyphonic key pressure (where the user has more than one melody part, for example), pitch bend, (e.g., where the user specifies the change in pitch that is smaller than the standard smallest musical note interval) and so forth. Parameters for each of the points on the melody curves, bass curves and rhythm graphical representations are based on the position of note points or rhythm bars in these portions of the graphical representation.

A standard MIDI sound card reads these messages. In response, the MIDI sound card plays audio corresponding to the graphical representation.

As mentioned, the user can begin by selecting a portion of a musical piece that is then modified for purposes of searching the database. In this case, an audio signal which is obtained from the database for input externally is converted to a graphical representation that the user can modify. Such a conversion will be unnecessary where the user is replying to an existing inquiry or to refining a preexisting search, or any instance where the graphical representation of a musical segment is already available. A conversion from audio to a graphical representation is only necessary where the starting point is an audio signal that the user wishes to modify graphically.

Those skilled in the art will appreciate that an audio signal-to-graphical representation can be implemented using any of a variety of existing products. For example, a raw audio signal can be converted to a graphical representation using, for example, IntelliScore available from Innovative Music Systems, Inc., Version 4.0, or AKoff Music Composer, Version 2.0 available from AKoff Sound Labs. The MIDI specification associated with the MIDI format available from the MIDI Manufacturer's Association, General MIDI 2 Specification In step 130, a musical query is generated based on the musical segment that was generated graphically. The musical query can be in a variety of formats, such as string, MIDI, audio (e.g., formatted using extracted features such as spectrograms, mel frequency cepstral coefficients (MFCCs)), and the like, as appropriate for a search engine that is used to search the database containing the desired musical file.

Optionally, in step 125, the user is asked to acknowledge whether the musical segment is acceptable. If the musical segment is not acceptable to the user, then the step of graphically generating the musical segment and the step of providing audio feedback are repeated until the user acknowledges the musical segment as acceptable. Once the user has acknowledged the musical segment is acceptable, then the step of generating the musical query is performed.

Once again, the form of the musical query can depend on the database being searched. For instance, the graphical representation can be converted into a MIDI format. Then, the sequence of MIDI data can be used to query a compatible database, such as the search engines disclosed in the previously discussed article by Bainbridge et al., the SEMEX system, and McNab et al., "Towards the Digital Music Library: Tune Retrieval from an Acoustic Input", Proc. Digital Libraries, 1996, pages 11–18, which is hereby incorporated by reference in its entirety. Alternatively, the graphically generated musical segment can be converted into a string format that is compatible with the "U,D,S" string format disclosed and used by the previously mentioned Ghias et al. article.

In the event that a digital representation of the music cannot be directly input into the search algorithm, then the graphically generated musical segment can be provided in an audio format, such as a wav file. In any case, the graphical generation of the musical search with audio feedback allows the user intuitively construct and hear the musical segment that is used for the musical query. Users create the musical segment based on interactively seeing and hearing it, as opposed to reproducing it via humming and the like. The present invention can provide either or both visual and audio feedback to the user, which allows the user to interactively refine the musical segment that will be used for the query. Additionally, since the user interface is graphical in nature, no particular musical skill or understanding of musical theory is necessary.

Figure 2:
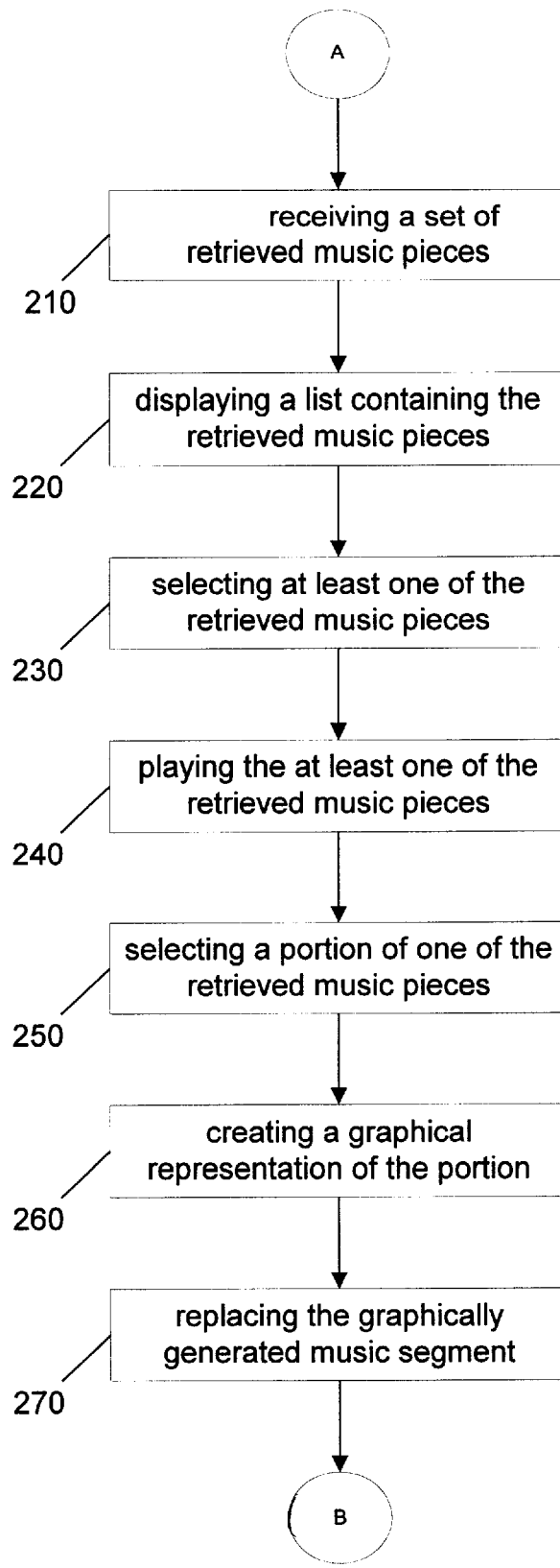
FIG. 2 shows a flow chart for additional exemplary methods of the present invention.

The feedback to the user can be expanded to include any form of feedback, including feedback from the database being searched. For example, in step 210 of FIG. 2, a set of retrieved musical pieces is received from a searchable musical database. In step 220, a list containing the retrieved musical pieces is displayed. The user can select at least one of the retrieved musical pieces, in step 230. Then, in step 240, the at least one of the retrieved musical pieces can be played back to the user. If the user has found the desired musical piece, then the process will end. However, if the desired musical piece is not found, the steps of graphically generating the musical segment and providing audio feedback can be repeated until the user acknowledges the musical segment is acceptable, as shown in steps 110 and 120.

After the user has acknowledged the musical segment is acceptable, a second musical query can be generated based on at least one of the retrieved musical pieces, as in step 130. The user can use feedback from the retrieved music pieces to graphically adjust the musical segment. For example, if all the retrieved pieces have similar introductions, the user can expand the segment (i.e., add more notes) to further define the subsequent search. This would be analogous to adding additional keywords in a text-based search.

Still a further addition to the method can optionally include selecting a portion of one of the retrieved musical pieces, in step 250. Those skilled in the art will appreciate that the selected portion of the musical piece can be obtained from any source (e.g., already stored on the user's computer), and need not be retrieved by the user from the musical database. A graphical representation of the selected portion (regardless of where it is obtained) is then created, in step 260. The graphically generated musical segment is replaced with the graphical representation of the selected portion, in step 270. Once again, the steps of graphically generating the musical segment and the providing audio feedback can be repeated, until the user acknowledges the musical segment is acceptable, as in steps 110 and 120. Then, as in step 130, after the user has acknowledged the musical segment is acceptable, a second musical query is generated based on graphical representation of the selected portion.

In this example, a portion of one of the retrieved music pieces is used as the basis for generating a new query. For instance, a user may find that the retrieved file is closer to the user's desired file than the musical segment previously created. Therefore, the user can copy a portion of the retrieved file and replace the current musical segment. Those skilled in the art will appreciate that any conventional method of graphically editing can be used to accomplish these steps, such as copy and paste routines, and the like. Further, the portion of the retrieved music piece can be appended or replace only part of the musical segment. For example, the user can copy and paste a rhythm portion of the retrieved song to a rhythm section of the graphical interface for generating the musical segment. Once incorporated into the graphical interface, the new portions can be edited in the same manner, as previously described, to further refine the musical segment that is used for the query.

The invention can be implemented in a software program (e.g., a JAVA program) that allows the user to access the graphical interface for graphically generating the musical segment via a web browser over a network (e.g., a LAN, WAN, the internet, wireless network, and the like). For example, a musical library such as that contained at the Library of Congress can allow users to search and retrieve music over the internet. Additionally, most new music purchases are based upon the purchaser hearing the music on the radio. However, in most instances the purchaser does not hear the entire song, artist, and/or title. Therefore, the present invention can be used by music companies or retail music stores to allow purchasers to search for songs based upon only a portion of the song the user has heard recently. Once again, the graphical interface for creating the musical can be accessed by a web browser and can query for a song via the internet remotely or on a LAN in a music store.

Figure 3:
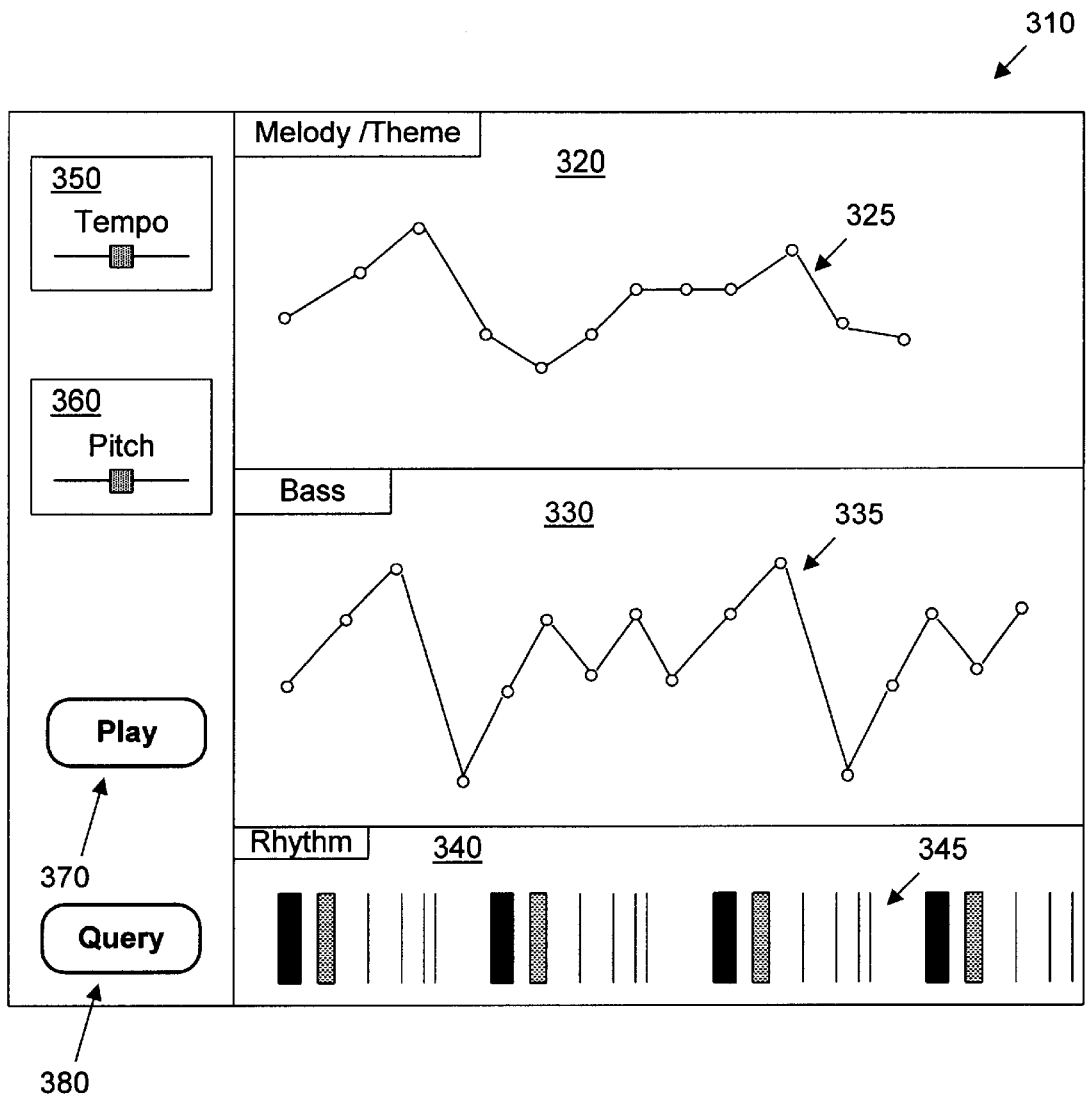
FIG. 3 illustrates an exemplary graphical interface of the present invention.

FIG. 3 shows an exemplary graphical interface 310 for graphically creating a musical search. For example, the musical segment generation section can be divided into three sections, such as a melody section 320, a bass section 330 and a rhythm section 340. Those skilled in the art will appreciate that invention is not limited to these sections and parts of a musical piece. For example, only the melody section can be used if the query only uses a monophonic search pattern.

Regardless of how many different sections are used to generate the musical segment, the user generates them via the graphical interface 310. For example, the user can generate a melody portion 325 of the musical segment using a graphical input device, such as a mouse, touch screen, stylus, graphics pad, joystick, and the like. The user simply sketches the musical segment, where higher tones are located at the top of the sections and lower tones are located at the bottom of the section. A similar process is used to sketch a bass portion 335 of the musical segment using the graphical input device. The rhythm portion 345 of the musical segment is also generated graphically using the graphical input device. However, since the rhythm portion 345 of the musical segment is based on a beat rather than the tone, the rhythm portion 345 can be graphically created by specifying the duration (i.e., width) and tempo (i.e., space between the individual elements). Optionally, those skilled in the art will appreciate that standard rhythm patterns (e.g., waltz, rock, boogie, swing, etc.) can be loaded into the graphical interface from a file to facilitate generation of the musical segment. However, the standard patterns can still be edited graphically by the user to generate a mucic segment that is acceptable to the user.

In addition to the three sections for musical segment generation, controls can be provided to further facilitate the generation of an acceptable musical segment that is used to generate the musical query. For example, a tempo control 360 can be provided. The tempo control can be used to adjust the overall tempo of the musical segment to fine tune the tempo to the user's preference. A pitch control 370 can also be provided to fine tune the pitch of the musical segment. For instance, the overall pattern (i.e., the relative tone changes) can be acceptable, but a user may still wish to raise or lower the overall pitch (e.g., changing key) so the musical segment is more acceptable to the user. Alternatively, the user can graphically select the appropriate portion of the musical segment (e.g., the melody portion 325) and raise or lower the pitch by dragging the portion up or down as appropriate.

A play button 370 can be provided for the user to initiate audio feedback of the musical segment during the generation of the musical segment. Alternatively, the feedback can be automatically generated at a fixed interval (i.e., every 30 seconds until the query is sent) or each time a portion 325, 335, or 345 is edited or selected. A query button 380 can be provided that allows the user to generate the musical query after the user is satisfied with the musical segment.

The exemplary graphical interface of FIG. 3 allows a user to specify a polyphonic musical segment including rhythm for generating musical searches. Unlike current systems that rely on the user to generate the musical segment in one take with no feed back, the present invention also provides audio feedback which allows the user to hear and refine the musical segment before the search is generated. Since users are more capable of recognizing an in tune musical segment than reproducing an in tune musical segment, the present invention allows the user to generate a musical segment that has fewer errors. Additionally, since the musical segment is generated graphically in a digital form, it can be directly reproduced or converted into another digital format (e.g., MIDI, "U, D, S", and the like). Therefore, information is not lost or corrupted due to noise, pitch estimation algorithms, clipping, and the like, as with the present systems.

To facilitate an understanding of the invention, many aspects of the invention are described in terms of sequences of actions to be performed by elements of a computer-based system. It will be recognized that in each of the embodiments, the various actions can be performed by specialized circuits (e.g., discrete logic gates interconnected to perform a specialized function), by program instructions being executed by one or more processors, or by a combination of both. Moreover, the invention can additionally be considered to be embodied entirely within any form of a computer readable storage medium having stored therein an appropriate set of computer instructions that would cause a processor to carry out the techniques described herein. Thus, the various aspects of the invention can be embodied in many different forms, and all such forms are contemplated to be within the scope of the invention. For each of the various aspects of the invention, any such form of an embodiment is referred to herein as "logic that" performs a described action.

Figure 4:
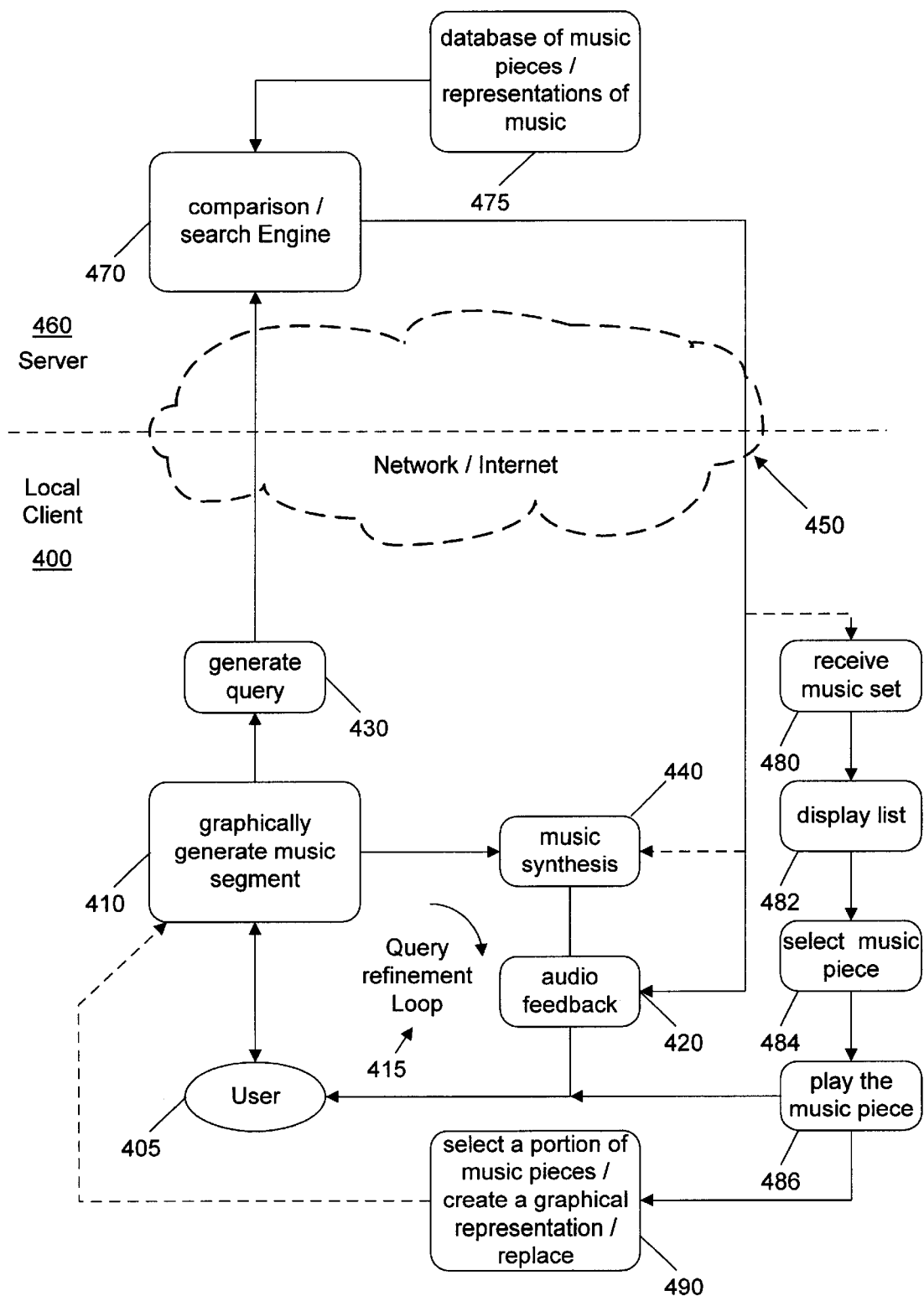
FIG. 4 illustrates an exemplary system of the present invention.

FIG. 4 illustrates an exemplary computer-based system 400 for creating a musical query. The system comprises logic that graphically generates a musical segment 410 that represents a portion of a desired piece of music. Further the system includes logic that provides audio feedback 420 to a user 405 by playing the musical segment and logic that generates a musical query 430 based on the musical segment. Optionally, the computer-based system additionally includes logic that synthesizes 440 the musical segment prior to providing the audio feedback. The system also includes logic 415 that allows the user to repeat graphically generating the musical segment and providing audio feedback, until the user acknowledges the musical segment is acceptable, as represented by query refinement loop. After the user has acknowledged the musical segment is acceptable, the logic that generates the musical query 430 is activated.

In another embodiment, the computer-based system 400 can include logic that receives a set of retrieved music pieces 480 from a searchable music database 475. Then, logic that displays a list 482 containing the retrieved music pieces presents the retrieved music to the user. The user can then select pieces from the list using logic that selects 484 the retrieved music pieces. Audio feedback is provided by logic that plays 486 the selected retrieved music pieces to the user. Those skilled in the art will appreciate that there are many other ways to present the retrieved music to the user. For example, the retrieved music can be played directly using the audio feedback logic 420. Alternatively, the retrieved music can be fed to the music synthesis logic 440 (e.g., the retrieved music is in the form of MIDI files) before being presented to the user via the audio feedback logic 420.

In addition to just playing the retrieved music files, the user can use logic block 490 that contains logic that selects a portion of one of the retrieved music pieces, logic that creates a graphical representation of the selected portion, and logic that replaces the graphically generated musical segment with the graphical representation of the selected portion. Thus, the user can refine the original graphically generated musical segment by replacing it with a segment of a retrieved music file. Then, the user can make further refinements to the musical segment by using logic that allows the user to repeat 415 graphically generating the musical segment and providing audio feedback, until the user acknowledges the musical segment is acceptable. Then, a second query can be generated based on the graphical representation of the selected portion using logic that generates the musical query 430, after the user has acknowledged the musical segment is acceptable.

In yet another embodiment, the computer-based system 400, can include a software program that allows the user to access a graphical interface for graphically generating the musical segment via a web browser via a network 450. Further, the system can be a local client 400, connected via the internet 450 to server 460 where the desired piece of music resides on the server 460. For example, music companies can deploy an Internet-based system that allows the user to search the company's portfolio of music via a web browser from the users home, office, etc. Once located, the music can be purchased and downloaded to the user.

The foregoing has described principles, preferred embodiments and modes of operation of the invention. However, the invention is not limited to the particular embodiments discussed above. Therefore, the above-described embodiments should be regarded as illustrative rather than restrictive, and it should be appreciated that variations may be made in those embodiments by those skilled in the art, without departing from the scope of the invention as defined by the following claims.

What is claimed is:

1. A method of creating a musical query comprising:

graphically generating a musical segment that represents a portion of a desired piece of music;

providing audio feedback to a user by playing at least a portion of the generated musical segment;

generating a musical query based on the generated musical segment;

retrieving at least one music piece from a music database based on the generated musical query;

selecting at least a portion of one of the retrieved music pieces;

creating a graphical representation of the selected music portion; and generating a second musical query based on the created graphical representation of the selected music portion.

2. The method of claim 1, comprising:

synthesizing the musical segment prior to the step of providing the audio feedback.

3. The method of claim 1, comprising:

repeating the step of graphically generating the musical segment and the step of providing audio feedback, until the musical segment has been acknowledged as acceptable; and wherein the step of generating the musical query based on the graphically generated musical segment is performed after the musical segment has been acknowledged as acceptable.

4. The method of claim 1, comprising:

displaying a list containing the retrieved music pieces;

selecting at least one of the retrieved music pieces; and playing the selected at least one of the retrieved music pieces to the user.

5. The method of claim 1, wherein the musical query is in a string format.

6. The method of claim 1, wherein the musical query is in a MIDI format.

7. The method of claim 1, wherein the musical query is in an audio format.

8. The method of claim 1, wherein the method is implemented in a software program accessible by a graphical interface for graphically generating the musical segment via a web browser over a network.

9. The method of claim 1, comprising:

modifying the musical segment produced during the step of graphically generating in response to user inputs to change characteristics of the musical segment.

10. The method of claim 1, comprising:

replacing the generated musical segment with the created graphical representation of the selected music portion, graphically adjusting the replaced generated musical segment; and providing audio feedback to a user by playing at least a portion of the adjusted generated musical segment.

11. The method of claim 10, comprising:

repeating the step of graphically adjusting the replaced generated musical segment and the step of providing audio feedback from the adjusted generated musical segment, until the adjusted generated musical segment has been acknowledged as acceptable; and wherein the step of generating the second musical query is performed after the adjusted generated musical segment has been acknowledged as acceptable.

12. The method of claim 11, comprising:

graphically adjusting the replaced generated musical segment in response to user inputs to change characteristics of the musical segment.

13. The method of claim 1, wherein the generated musical segment comprises a bass and/or a rhythm section for generating the musical query.

14. The method of claim 1, comprising:

graphically adjusting the tempo of the generated musical segment to fine tune the tempo of the musical segment.

15. A computer-based system for creating a musical query comprising:

logic that graphically generates a musical segment that represents at least a portion of a desired piece of music;

logic that provides audio feedback to a user by playing at least a portion of the generated musical segment;

logic that generates a musical query based on the generated musical segment;

logic that retrieves at least one music piece from a music database based on the generated musical query;

logic that selects at least a portion of one of the retrieved music pieces;

logic that creates a graphical representation of the selected music portion; and logic that generates a second musical query based on the created graphical representation of the selected music portion.

16. The computer-based system of claim 15, comprising:

logic that synthesizes the musical segment prior to providing the audio feedback.

17. The computer-based system of claim 15, comprising:

logic that allows the user to repeat graphically generating the musical segment and providing audio feedback, until the musical segment has been acknowledged as acceptable; and wherein the logic that generates the musical query is activated after the musical segment has been acknowledged as acceptable.

18. The computer-based system of claim 15, comprising:

logic that displays a list containing the retrieved music pieces;

logic that selects at least one of the retrieved music pieces; and logic that plays the selected at least one of the retrieved music pieces to the user.

19. The computer-based system of claim 15, wherein the musical query is in a string format.

20. The computer-based system of claim 15, wherein the musical query is in a MIDI format.

21. The computer-based system of claim 15, wherein the musical query is in an audio format.

22. The computer-based system of claim 15, wherein the logic for graphically generating the musical segment is implemented in a software program accessible by a graphical interface for graphically generating the musical segment via a web browser over a network.

23. The computer-based system of claim 22, wherein the computer-based system is a local client, the network is the internet, and the desired piece of music resides on a server connected to the local client via the Internet.

24. The computer-based system of claim 15, comprising:

logic that modifies the generated musical segment in response to user inputs to change characteristics of the musical segment.

25. The computer-based system of claim 15, comprising:

logic that replaces the generated musical segment with the created graphical representation of the selected music portion;

logic that graphically adjusts the replaced generated musical segment; and logic that provides audio feedback to a user by playing at least a portion of the adjusted generated musical segment.

26. The computer-based system of claim 25, comprising:

logic that allows the user to repeat graphically adjusting the replaced generated musical segment and providing audio feedback from the adjusted generated musical segment, until the adjusted generated musical segment has been acknowledged as acceptable; and wherein the logic that generates the second musical query is activated after the adjusted generated musical segment has been acknowledged as acceptable.

27. The computer-based system of claim 26, comprising:

logic that graphically adjusts the replaced generated musical segment in response to user inputs to change characteristics of the musical segment.

\* \* \* \* \*